June 9, 1959

D. I. BARKHEIMER 2,890,010

ADJUSTABLE TELEVISION RECEIVER STAND

Filed Dec. 16, 1954

2 Sheets-Sheet 1

INVENTOR.

Donald I. Barkheimer

BY Victor J. Evans & Co.

ATTORNEYS

June 9, 1959 D. I. BARKHEIMER 2,890,010

ADJUSTABLE TELEVISION RECEIVER STAND

Filed Dec. 16, 1954 2 Sheets-Sheet 2

INVENTOR.

Donald I. Barkheimer

BY Victor J. Evans & Co.

ATTORNEYS

United States Patent Office 2,890,010

Patented June 9, 1959

2,890,010

ADJUSTABLE TELEVISION RECEIVER STAND

Donald I. Barkheimer, Hobe Sound, Fla.

Application December 16, 1954, Serial No. 475,756

1 Claim. (Cl. 248—157)

This invention relates to stands, cabinets, and the like for supporting television receivers, and in particular, a stand in which the height is readily adjustable and in which means is provided for tilting the casing of the set or receiver to facilitate viewing a picture on the screen thereof.

The purpose of this invention is to provide an adjustable cabinet or stand for television receivers wherein the elevation of the picture screen and also the angle thereof is adjustable to compensate for the positions of persons and particularly a group of persons viewing a picture being received by the television set.

Television stands have been provided with swivel tops that permit the screen to be turned to different angles and television cabinets have been made to different heights, however, it is difficult to adjust the elevation of the screen to accommodate persons of different ages and, particularly where children are positioned on a floor, it is desirable to tilt the screen to correspond with lines of vision of the children. With this thought in mind, this invention contemplates a television stand having a base with a television receiver retaining top mounted on telescoping legs with an accordion or bellows type filling element between the top and base and with a threaded telescoping element adapted to be actuated by a motor for raising and lowering the top and receiver.

The invention also includes means for tilting the television receiver cabinet positioned on the top.

The object of this invention is, therefore, to provide means for forming a stand adapted to support a television receiver whereby the top of the stand, on which the receiver may be positioned, is adapted to be moved upwardly and downwardly by operating instrumentalities in the stand.

Another object of the invention is to provide an adjustable stand for a television receiver in which means is provided for tilting a receiver positioned on the stand.

A further object of the invention is to provide a stand for a television receiver having means for raising and lowering a supporting top or platform at the upper end of the stand and also having means for tilting the television receiver on the stand in which the stand is of a comparatively simple and economical construction.

With these and other objects and advantages in view, the invention embodies a box like base having telescoping tubes positioned in the corners and a threaded telescoping element in the center, a top carried by the tubes and element, a depending expansible filler positioned between the base and top and slidable blocks coacting with wedge elements and actuated by a screw having right and left hand threads for tilting a hinged platform on the top to tilt the face of the receiver.

Other features and advantages of the invention will appear from the following description, taken in connection with the drawings, wherein.

Figures 1, 2, 3, 4, 5:
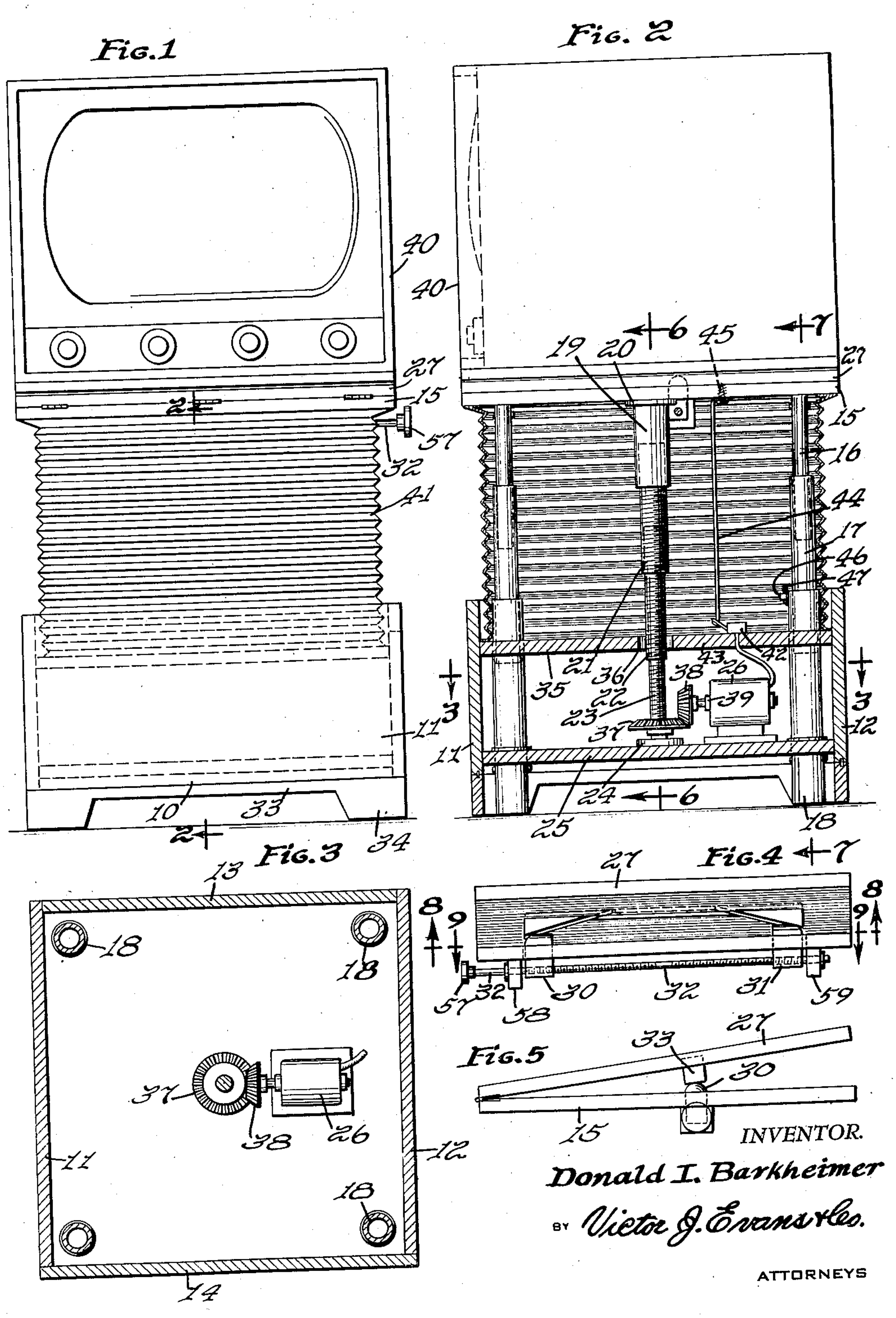
Figure 1 is a front elevational view of the adjustable television stand showing a television receiver positioned on the upper end of the stand and also showing the stand in an expanded position.
Figure 2 is a cross section through the stand illustrating the mounting and elevating means thereof and showing a television receiver in elevation on the upper part of the stand.
Figure 3 is a sectional plan through the base of the stand taken on line 3—3 of Figure 2.
Figure 4 is a rear elevational view showing the upper end of the stand with the television receiver and lower part of the stand omitted and showing the tilting platform in an upwardly extended position.
Figure 5 is a side elevational view showing the tilting platform and top of the stand with other parts omitted.

Referring now to the drawings, wherein like reference characters denote corresponding parts, the improved television receiver stand of this invention includes a base 10 having a front wall 11, a rear wall 12 and side walls 13 and 14, a top 15 carried on the upper ends of upper sections 16 of telescoping posts having intermediate sections 17 and lower sections 18, a threaded telescoping rod having an upper section 19 secured by a flange 20 to the top 15, intermediate sections 21 and 22 and a lower section 23 mounted in a bearing 24 on a lower panel 25 of the base, a motor 26 for actuating the threaded telescoping rod, a platform 27 secured to the top 15 with hinges having plates 28 on the platform and coacting plates 29 on the table top and blocks 30 and 31 positioned on and adapted to be actuated by a right and left hand threaded rod 32 and adapted to coact with wedges 33 and 34 on the under side of the platform 27 to tilt the platform.

The base 10 is positioned on a support or pedestal 33 having legs 34 and the upper part of the base is provided with a horizontally disposed panel 35 that coacts with the panel 25 for retaining the lower sections 18 of the telescoping posts in vertically disposed positions, and the panel 35 is provided with an opening 36 through which the threaded telescoping element extends.

The lower section 23 of the threaded telescoping element is provided with a beveled gear 37 that meshes with a beveled pinion 38 on a shaft 39 of the motor 26 whereby upon rotation of the motor the threaded telescoping element is adapted to be expanded and contracted to raise and lower the top 15 and platform 27 upon which the television receiver, as indicated by the numeral 40, is positioned.

The space between the upper end of the base 10 and top 15 is filled with a depending curtain or wall 41 formed with telescoping baffles or with plastic, leatherette or the like having an accordion fold.

A switch 42, mounted on the panel 35 and having an arm 43, is connected to the top 15 with a cord 44 whereby upon reaching the uppermost position the switch is actuated by the cord to break the circuit to the motor and the upper end of the cord is attached to the top 15 with a screw 45.

The stand is also provided with a button actuated switch 46 having a button 47 extended upwardly therefrom and as the top 15 reaches the lower position it will engage the button 47 and actuate the switch 46 to break the circuit to the motor, thereby providing means for limiting downward movement of the upper part of the stand.

The telescoping posts at the corners are retained in position in openings 48 in the lower panel 25 with pins 49 that extend through the tubular base sections 18 and engage the under surface of the panel 25, holding the parts in position with a collar 50 extended around the section 18 and positioned against the upper surface of the panel 25. The intermediate tube 17 is provided with a pin 51, the ends of which extend under a lip 52 in the upper end of the lower tube 18; and the upper section 16 is provided with a similar pin 53, the ends of which extend under an annular lip 54 on the upper end of the intermediate section 17. The upper end of the section 16 is provided with a block 55 into which a screw 56, extended through the top 15, is threaded. By this means the telescoping corner posts are rigidly secured in position and the top, platform, and television receiver are adapted to be moved upwardly and downwardly to a desired elevation.

Figures 6, 7, 8, 9, 10:
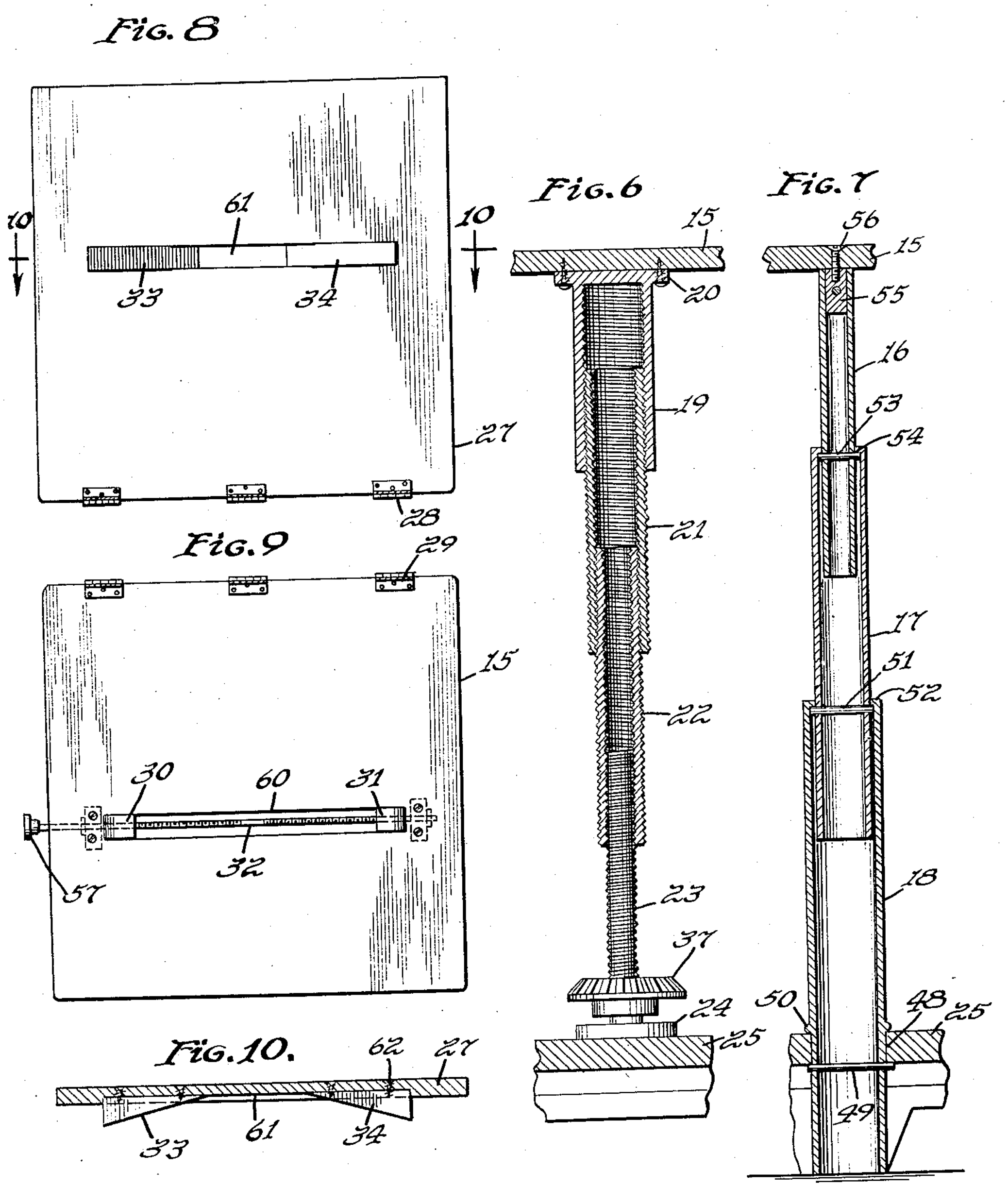
Figure 6 is a vertical section through the threaded telescoping element taken on line 6—6 of Figure 2, the element being shown on an enlarged scale and parts of the stand being broken away.
Figure 7 is a vertical section through one of the telescoping legs or posts of the stand being taken on line 7—7 of Figure 2 and the parts being shown on an enlarged scale.
Figure 8 is a view looking upwardly toward the under surface of the tilting platform being taken on line 8—8 of Figure 4.
Figure 9 is a plan view of the top of the stand being taken on line 9—9 of Figure 4 showing the relative positions of the tilting elements.
Figure 10 is a cross section through the tilting platform being taken on line 10—10 of Figure 8 and showing, in particular, the wedge elements that coact with the sliding blocks.

The tilting action of the platform 27, which is pivotally connected to the top 15 with the hinges formed with the plates 28 and 29, is obtained by rotating the threaded rod 32 with a knob 57 whereby the traveling blocks 30 and 31 are adapted to follow the right and left hand threads of the rod 32 to engage the sloping surfaces 33 and 34 of the wedges and with the blocks 30 and 31 drawn toward the center the platform with the receiver thereon is lowered and with the blocks moved outwardly to the positions shown in Figure 9 the back of the television receiver is elevated to facilitate viewing the picture screen thereof from the floor or by children in small chairs or the like.

The rod 32 is rotatably mounted in bearings 58 and 59 depending from the lower surface of the top 15, and as shown in Figures 4 and 9, the traveling blocks 30 and 31 extend through an elongated slot 60 to engage the sloping surfaces of the wedges or blocks. The wedges or blocks are positioned in a recess 61 in the lower surface of the platform 27 and the blocks are secured in position with screws 62.

With the parts assembled as illustrated and described, the platform 27 may be lowered to a horizontal position for general use and by completing circuits to the motor the platform with the television receiver set thereon may be moved upwardly or downwardly to correspond with the elevation of eyes of individuals viewing the picture screen. The picture screen is also adapted to be tilted to accommodate different lines of vision, by turning the knob 57.

The telescoping legs or posts at the corners and also the threaded telescoping rod may be provided with any suitable number of sections and may be formed in different designs and means may also be provided for preventing rotation of the intermediate sections of the threaded telescoping rod.

It will be understood that other modifications, within the scope of the appended claims, may be made in the design and arrangement of the parts without departing from the spirit of the invention.

What is claimed is:

A television receiver stand comprising a base provided with upper and lower horizontally disposed panels, and said base also having a front wall, a rear wall and side walls, telescoping posts having upper, intermediate, and lower sections, a top carried on the upper ends of the upper sections of the telescoping posts, a threaded telescoping rod having an upper section secured to the top; intermediate sections and a lower section connected to a lower panel of the base, a motor supported on the lower panel of the base for actuating the threaded telescoping rod, a platform hingedly secured to said top, a pedestal for supporting said base, beveled gear members connecting the motor and the lower threaded telescoping rod section for raising and lowering the top and platform; a curtain provided with accordion like folds extending between the upper panel of the base and said top, a limit switch contiguous to the upper portion of the base for selectively breaking the circuit to the motor, pins operatively connected to the telescoping members for retaining the telescoping members in proper position, and a knob actuated control mechanism arranged contiguous to the top for tilting the platform.

References Cited in the file of this patent

UNITED STATES PATENTS

| | | |
|---|---|---|
| 180,806 | Striegel | Aug. 8, 1876 |
| 335,432 | Dalzell | Feb. 2, 1886 |
| 404,396 | Fuller | June 4, 1889 |
| 507,807 | Green | Oct. 31, 1893 |
| 1,032,614 | Lamb | July 16, 1912 |
| 1,527,895 | Mazoch | Feb. 24, 1925 |
| 2,202,358 | Stone | May 28, 1940 |
| 2,354,515 | Greenwood | July 25, 1944 |
| 2,395,735 | Grigsby | Feb. 26, 1946 |
| 2,478,145 | Weber | Aug. 2, 1949 |
| 2,677,517 | Castello | May 4, 1954 |